Inventor
Richard R. Walton
By his Attorney
Carl E. Johnson.

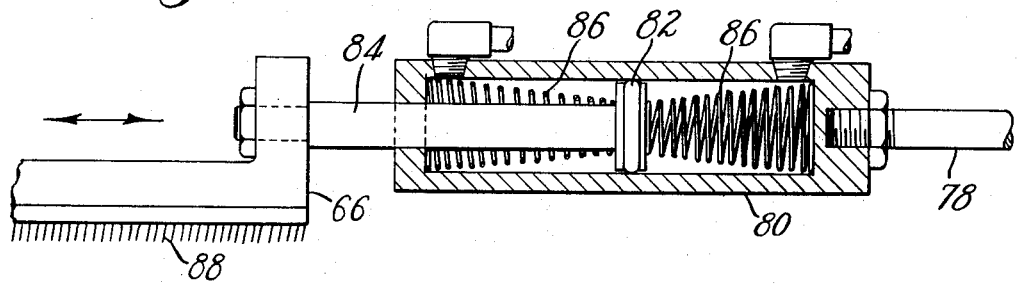
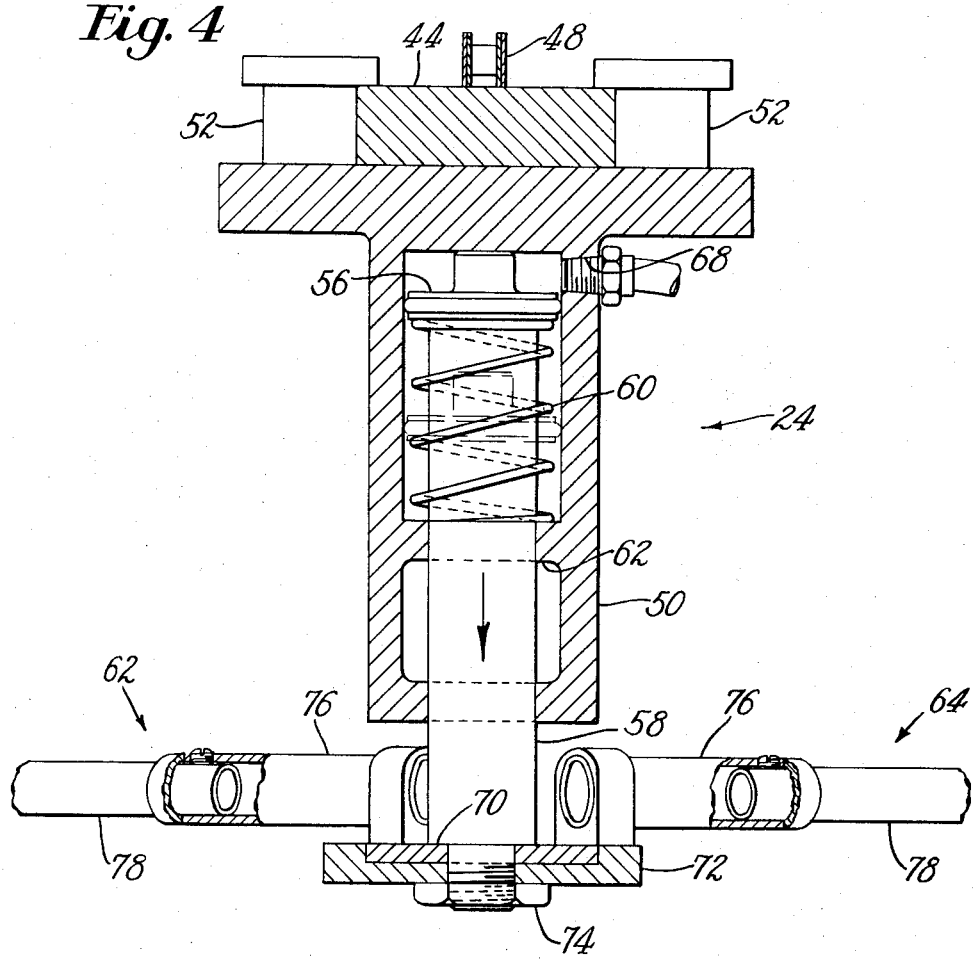

Dec. 5, 1967 R. R. WALTON 3,356,237
FABRIC POSITIONING MECHANISM
Filed June 10, 1966 9 Sheets-Sheet 4

United States Patent Office 3,356,237
Patented Dec. 5, 1967

3,356,237
FABRIC POSITIONING MECHANISM
Richard R. Walton, Boston, Mass., assignor to United Shoe Machinery Corporation, a corporation of New Jersey
Filed June 10, 1966, Ser. No. 556,606
12 Claims. (Cl. 214—89)

This invention relates to apparatus for positioning flexible sheet material, and more particularly to improved apparatus for positioning successive fabric work pieces for processing. The invention is herein shown and described, for purposes of illustration only, as applied to apparatus for automatically prepositioning individual work pieces such as towels to be registered with an operating device or station, for example a printing station. It will be appreciated nevertheless that the invention is in various aspects not thus limited in its application, but may well be useful in positioning flexible work pieces as required for any of a wide variety of purposes.

Because of their limpness extensibility, and lack of mass it is difficult accurately to control the positioning of single pieces of fabric and the like. To expedite and facilitate their movement with respect to devices for successively operating on them in uniform manner, without requiring slow and tedious hand manipulation, necessitates the use of versatile equipment and novel techniques not currently available in industry so far as is known. A specific and representative example of this situation is found in feeding and locating successive work pieces of fabric, for instance towels, at a work station to receive an impression on a selected portion or in uniformly predetermined relation to a margin thereof; incorrect orientation of the work relative to a printing or other device usually results in rejects.

In view of the foregoing it is a primary object of this invention to provide, in combination with means for feeding successive fabric work pieces to a work station, a unique positioning mechanism for insuring that each piece will be automatically located in predetermined orientation on the feeding means.

A further object of the invention is to provide a reliable, uncomplicated positioning mechanism adaptable for dealing with different sizes and shapes of flexible work pieces.

Yet another object of this invention is to provide a fabric positioner capable of seizing each piece to be positioned and uniformly tensioning it at least in one direction before it cooperates with a sensing device to determine its relation to an operating instrumentality, for example, a printing device.

To these and other ends, and as herein shown in an illustrative embodiment, a feature of the invention resides in the provision of a first conveyor and means for stopping a work piece thereon when an edge of the piece has arrived at a predetermined position, a second conveyor extending from the first conveyor for feeding movement toward a work station and including along its operating path means for adjustably predetermining the position of another edge of the work piece in relation to said path, and a rotary transfer head operable in translation between the work stopping position on the first conveyor and into cooperative relation with said positioning means on the second conveyor, the positioning means being adapted to angularly control the transfer head and hence the position of the work piece when released therefrom to the second conveyor.

As herein shown the transfer head preferably is not only angularly controlled by the aforementioned positioning means predeterminedly to align a work piece with respect to the second conveyor, but translatory movement of the head is regulated in time relation to operation of at least one of the conveyors, and descent of the head initiated to deposit the piece in proper position on the second conveyor. Further novel features reside in the construction of the rotary transfer head which is adapted to seize and tension the work piece outspread in its own plane, in a fabric conveyor comprising spaced endless belts cooperative to receive and releasably maintain the work piece outspread in the condition received throughout their travel, and in the combination of such transfer and conveyor means.

The foregoing and other novel features and arrangements of parts and details in construction will now be more particularly described in connection with an illustrative embodiment, and with reference to the accompanying drawings thereof, in which:

FIG. 3 is a section taken on the line III—III of FIG. 2 and indicating, on a larger scale, construction details of an arm of the transfer head shown in FIGS. 1 and 2;

FIG. 4 is a vertical section taken on the line IV—IV of FIG. 2 and indicating, on a larger scale, means for actuating the transfer head heightwise;

Figure 2:
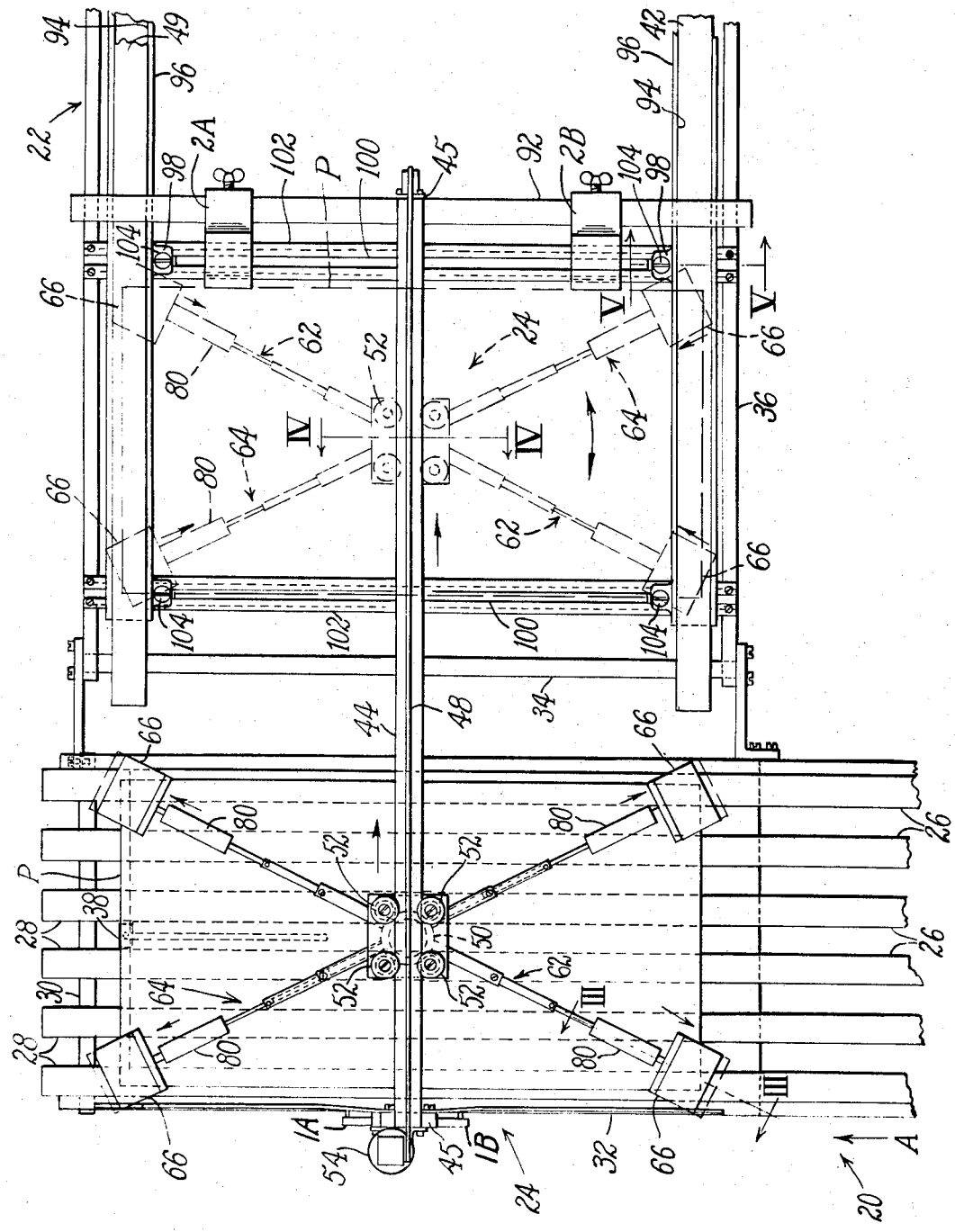
FIG. 2 is a plan view of the apparatus shown in FIG. 1.
Figure 5:
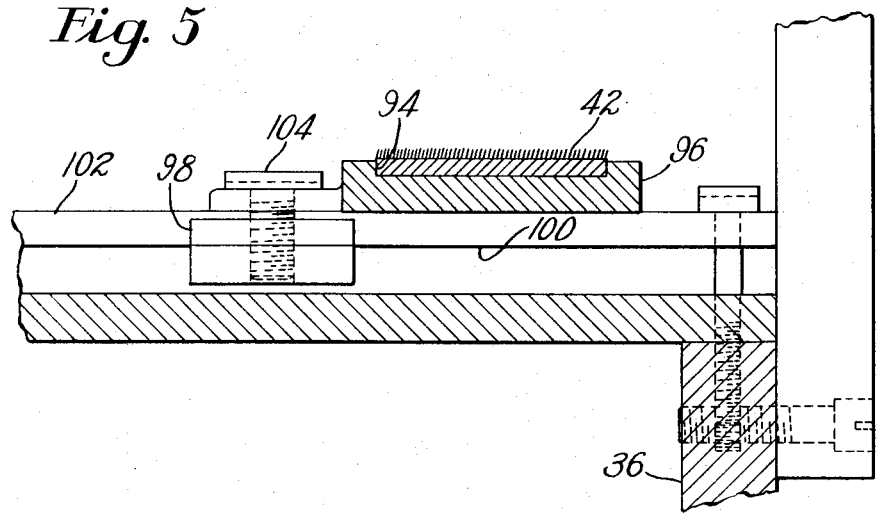
FIG. 5 is a section taken on the line V—V of FIG. 2 and indicating on a larger scale the adjustability of one of the conveyors of FIG. 2 having fabric retaining feed belts.
Figure 6:
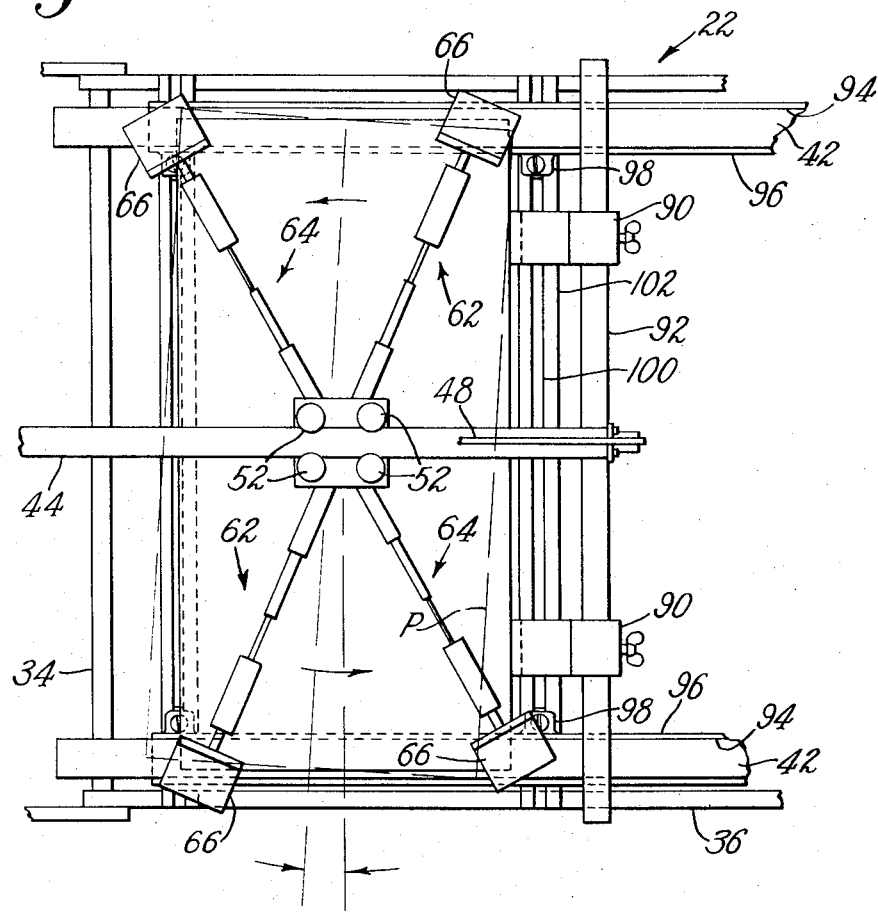
Figure 7:
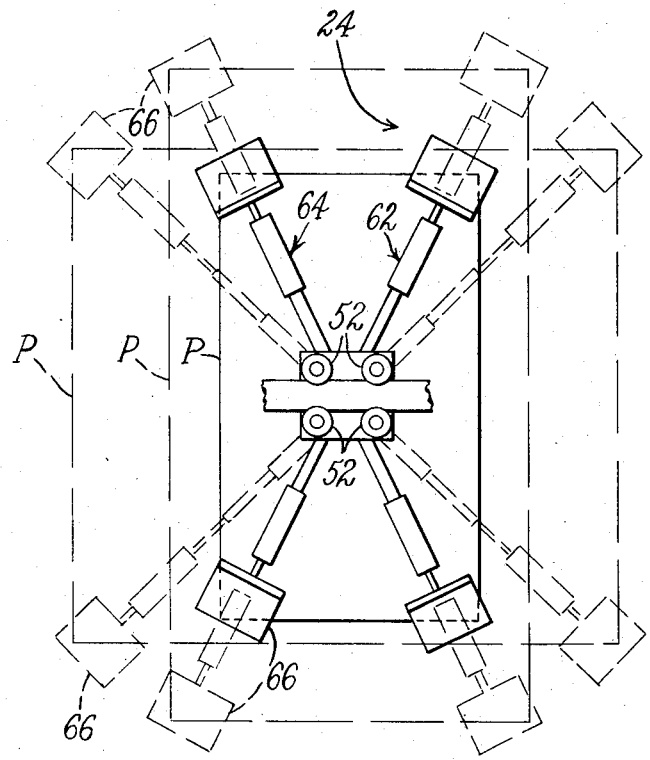
Figure 8:
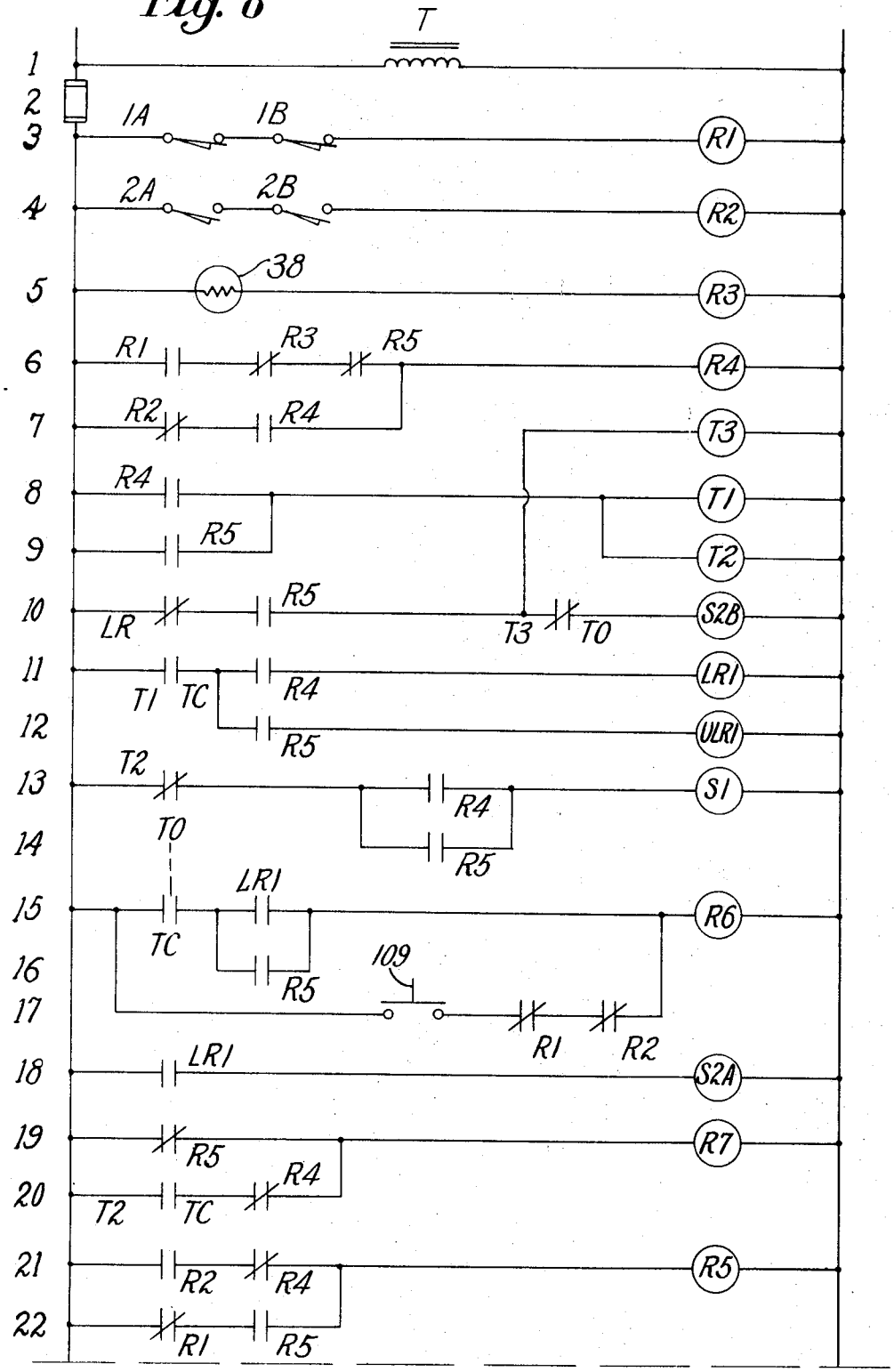
Figure 9:
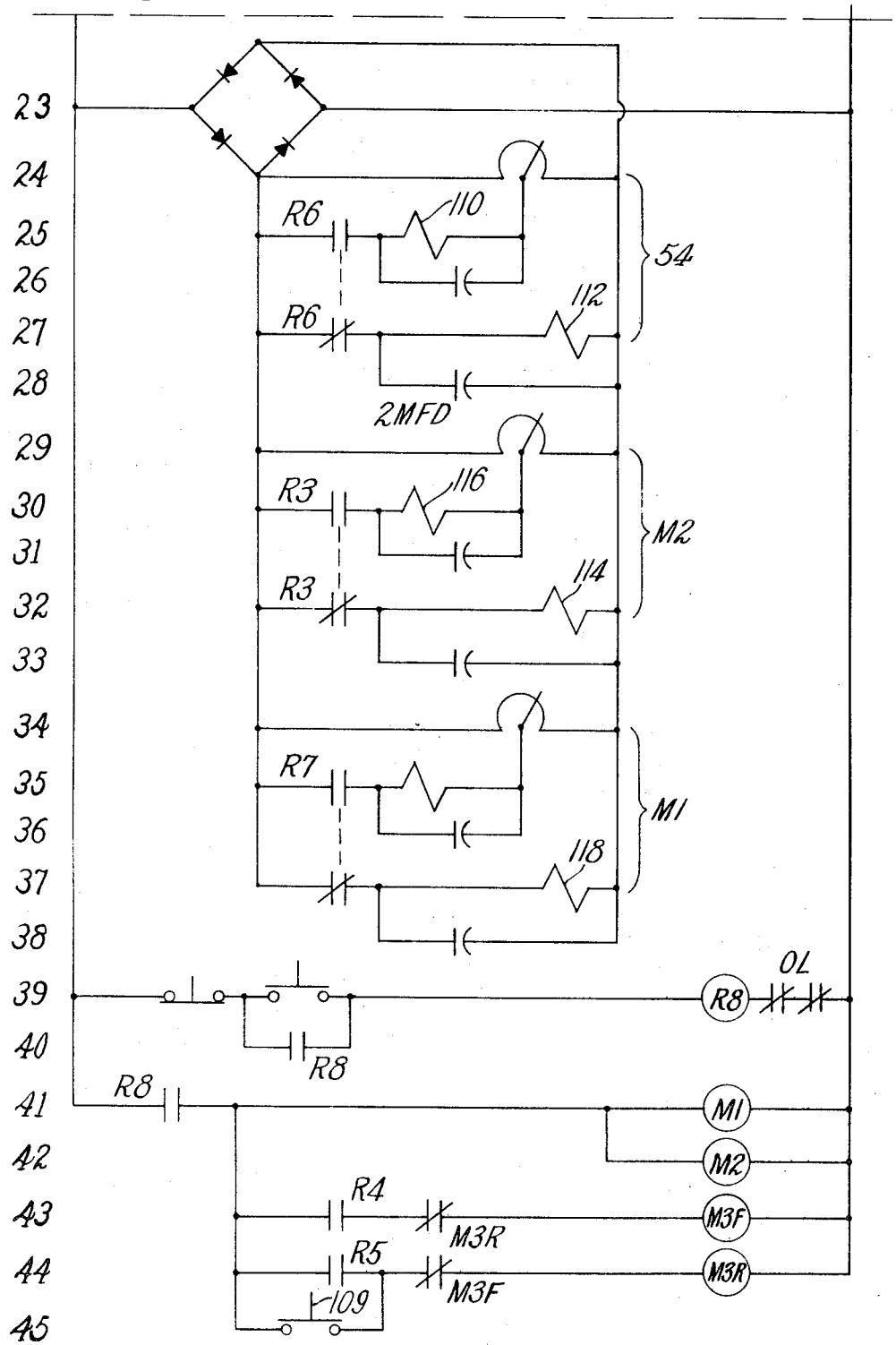

FIG. 6 corresponds to the right-hand portion of FIG. 2 and indicates rotation of the transfer head with its work piece about a vertical axis for alignment with stops;

FIG. 7 is a diagrammatic view corresponding in part to FIG. 6 and indicating adjustability of the transfer head to different shapes and sizes of work pieces;

FIGS. 8 and 9 are complemental portions of an electrical diagram of the machine, its main power lines being assumed to be non-energized.

Figure 10:
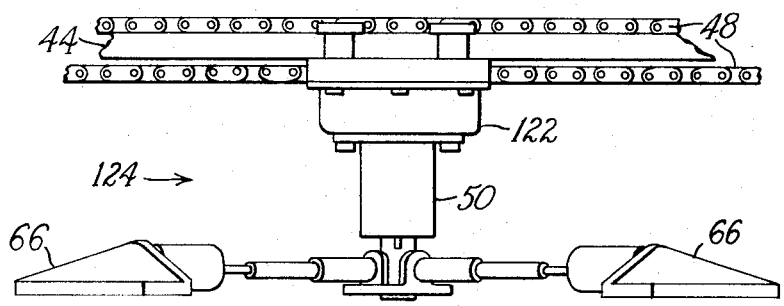
Figure 11:
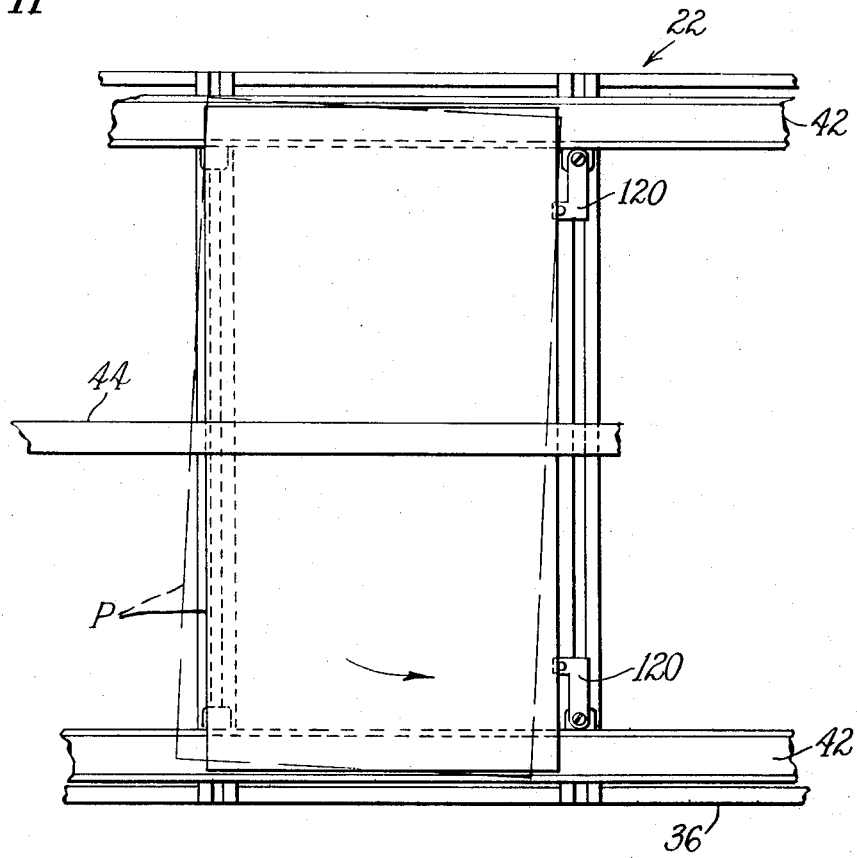
Figure 12:
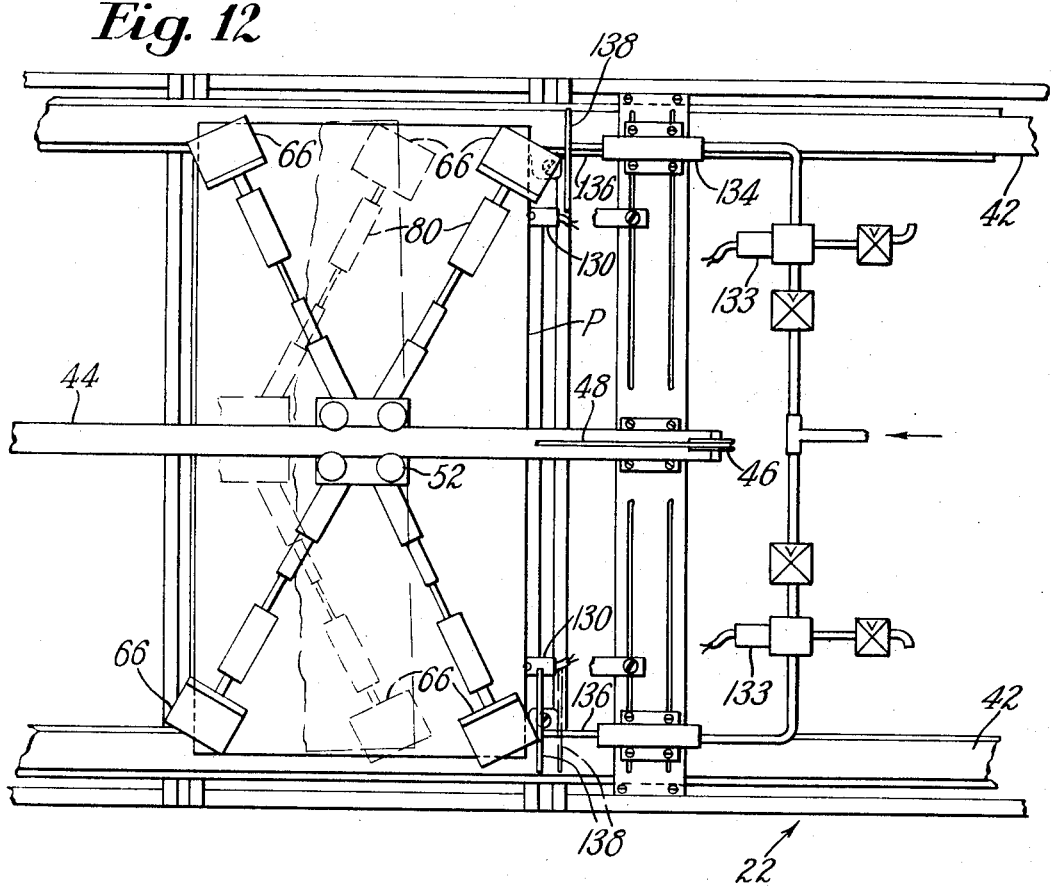

FIG. 10 is a view in side elevation of an alternate and more sophisticated transfer head;

FIG. 11 is a plan view similar to FIG. 6 and showing photocell sensors employed for controlling the head shown in FIG. 10;

FIG. 12 is a plan view of alternate work sensing and positioning means; and

Figure 13:
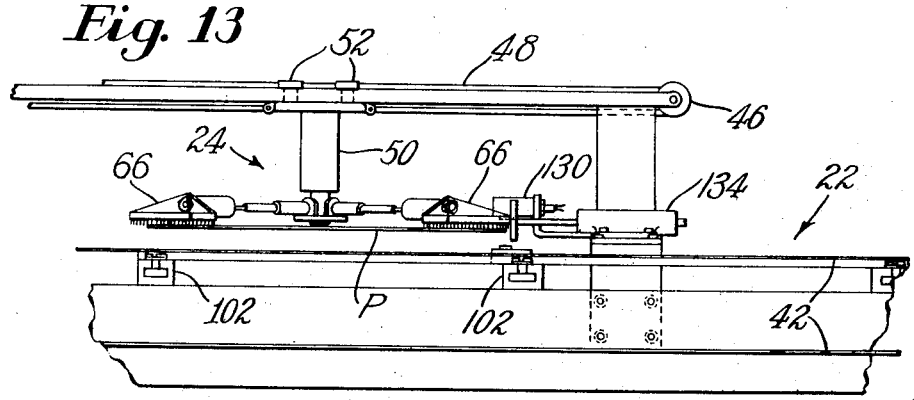

FIG. 13 is a side elevation of the mechanism shown in FIG. 12.

The illustrative apparatus comprises a first motor driven conveyor generally designated 20 (FIGS. 1 and 2), a second motor driven conveyor generally designated 22 (FIGS. 1, 2, 5, 6), and a rotary transfer head generally designated 24 movable in translation between a pick-up zone on the conveyor 20 and an orienting and deposit zone on the conveyor 22. Accordingly, as will hereinafter be explained in detail, successive pieces P of flexible sheet material such as towels to be processed, are initially carried on the upper reach of spaced endless belts 26 of the conveyor 20 in the direction of the arrow A on FIG. 2, the belts passing around coaxial pulleys 28 rotatable on a shaft 30 journaled in an upper end of a frame 32. Each piece P may, for instance, have been fed onto the conveyor seriatim from an automatic fabric unstacker of the general type disclosed in a copending application Ser. No. 523,301, filed Jan. 27, 1966 in my name.

The conveyors 20, 22 may be generally aligned or, as shown, extend angularly with respect to one another, it normally being preferable that the delivery end of the conveyor 20 be in the vicinity of a pulley shaft 34 journaled in a frame 36 of the conveyor 22 though not necessarily at the same level. The direction of feeding by the conveyor 22 is selected to move the pieces P, as oriented thereon by the head 24, directly into, and perhaps through, an operating station (not shown) such as a silk screen printer.

For automatically stopping the conveyor 20 and then lowering the transfer head 24 to its pick-up position when a piece P has arrived at the pick-up zone on the conveyor 20, a sensor in the form of a photoelectric cell 38 (FIGS. 1, 2 and 8) is arranged to have its activating beam intercepted by the leading edge of the piece. The pulley shaft 34 (and at least one more similar to it but not shown) carries a pair of pulleys 40, 40 axially adjustable widthwise of the conveyor 22 for rotating a pair of work receiving-retaining belts 42, 42, respectively, later described. For guiding the rotary transfer head 24 in translation above the conveyors 20, 22 and along a path extending substantially mid way between the belts 42, a beam 44 (FIGS. 1, 2 and 4) rectangular in section is supported by vertical brackets 45 secured to the frames 32, 36 respectively. The beam 44 supports at each end a sprocket 46 carrying a looped chain 48 to the adjacent ends of which there is attached a vertical actuating cylinder 50 of the head 24. The cylinder 50 is slidable along the beam and supported thereon by means of four flanged rollers 52 pivoted to the top of the cylinder. Thus a reversible motor 54 (FIGS. 1, 2 and 9) drivingly connected to one of the sprockets 46, when energized as later explained, is effective to transfer the head 24 laterally between a work pick-up position (on the left in FIGS. 1 and 2) and a work deposit position (on the right in FIGS. 1 and 2) i.e. between the solid and broken line position of the head 24.

Figure 1:
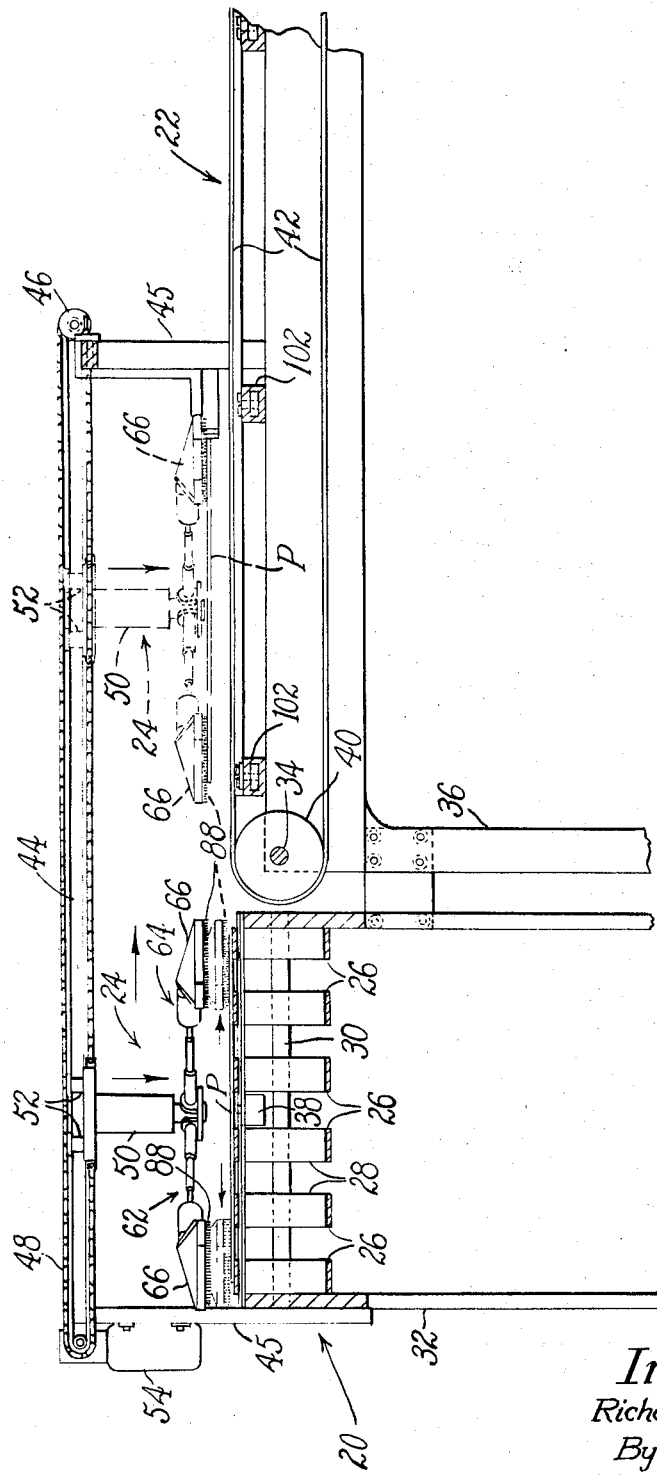
FIG. 1 is a view in side elevation and partly in section of mechanism for positioining fabric work pieces, a rotary transfer head being indicated in two operating positions relative to a pair of conveyors.

The transfer head 24 will next be described in detail with particular reference to FIG. 4. Its cylinder 50 is fitted with a piston 56 on a rotary piston rod 58 which is biased upwardly by a return spring 60 confined between the piston and a guide web 62 in the cylinder. The lower end of the rod 58 carries two pairs of diametrically extending composite arms 62, 62 and 64, 64 the respective outer ends of which are provided with radially projectable work-engageable claws or pads 66 (FIGS. 1-3). The arrangement accordingly is such that when fluid under pressure is admitted into a port 68 above the piston the pads 66 move heightwise into and out of work gripping relation. As shown in FIG. 4 the arms 62 have their inner ends secured to or integral with a circular disk 70 nested in a recess in an annular bearing clamp 72 mounting the arms 64, both the disk 70 and the clamp 72 being secured against a shoulder of the threaded lower end of the rotary rod 58, in selected angular relation with respect to each other, by means of a clamping nut 74. Since the arms 62 and 64 essentially correspond it will suffice to explain the construction and operation of one of them. Adjustably telescoped in a tubular inner portion 76 (FIG. 4) is an extension 78 (FIG. 3) threadedly carrying a cylinder 80. Within the cylinder 80 is a double acting piston 82 having a piston rod 84 and opposed return springs 86. As later described in connection with the controlling electrical circuit of FIGS. 8 and 9, fluid under pressure is admitted to one side or the other of the piston 82 radially to extend or retract the pad 66 secured to the outer end of the rod 84. While the pads 66 may be of any suitable construction capable of gripping and exerting tension on the fabric P, they preferably include card cloth 88 in order easily to releasably grip spaced marginal portions of each piece P and spread it in its own plane and without detriment to the work piece. Also, as subsequently made clear, the card cloth pads or claws are especially well suited to cooperate with the belts 42, 42 in completing work transfer.

Before reaching the extreme limit of its possible travel (to the right in FIGS. 1 and 2) over the conveyor 22, the taut piece P being transferred by the laterally moving rotary head 24 will, if askew, have an advance edge initially engage one of the two abutments associated with or in the form of paddle limit switches 2A, 2B (FIGS. 2, 6 and 8) which are adjustably spaced widthwise of the conveyor 22 on a bar 92 secured transversely of the frame 36. The motor 54 still being operative, this skewed engagement exerts a torque causing the arms 62, 64 to turn in unison about the axis of the rod 58 until the other limit switch 2A or 2B is also actuated by the piece P. With its advance edge contacting both limit switches 2A, 2B the motor 54 is deenergized as later explained, a motor M1 (FIG. 9) driving the conveyor 22 is deenergized, and the piece P is properly alined for presentation to the next operating station and hence ready for deposit in such oriented condition on the belts 42.

Each of the belts 42 is preferably an endless loop of card cloth similar to the card cloth 88 of the pads 66 and having their projecting wire ends angularly biased to provide multiple, closely spaced points of engagement with the piece P. For enabling the belts 42 to maintain each piece P being transferred both flat and tenisoned in its oriented condition, the upper reach of each of the belts is disposed in a shallow channel 94 (FIG. 5) of a rigid guide 96. The respective guides 96 are carried on parallel, spaced blocks 98 (FIGS. 2, 5) adjustably slidable in a T-slot 100 of cross bars 102, 102 secured to the frame 36. Clamping bolts 104 threadably extending through the guide and into the respective blocks 98 permit the channels 94 to be shifted to accommodate different work piece sizes and, when secured in selected widthwise position, enable the belts 42 to retain the piece P uniformly outspread.

Actuation of the piston 56 of the head 24 to deposit the piece onto the belts 42 is effected when the head is lowered by operation of the control circuit to be explained, the pads 66 being releasably retracted simultaneously from the upper face of the four corners of the piece P when the pads have lightly pressed the under sides of the corners into retaining relation with the card cloth belts 42. The tendency of the taut fabric immediately to shorten its length and width on being released by the retraction of the pads 66 is effective to insure that the work will be caught on its margins and held outstretched by the card cloth belts 42 in oriented position. The head 24 now being unloaded, it is automatically raised by shutting off operating pressure in the cylinder 50, the pads 66 being controlled by fluid pressure as later explained. The conveyor 22 may now again operate to present the correctly oriented piece P to the next work station, and the motor 54 is energized to return the head 24 toward its pick-up position over the conveyor 20. This latter position is determined laterally and angularly by a pair of paddle limit switches 1A and 1B (FIGS. 2 and 8) adjustably secured to the conveyor frame 32 and arranged to be engaged by the pads 66, respectively.

A cycle of operation of the machine will now be reviewed having particular reference to operation of its electrical control circuit as shown in the diagram of FIGS. 8 and 9. Referring to FIG. 8, the transfer head 24 is assumed to be in its starting position indicated in FIG. 1, the switches 1A and 1B being closed by engagement therewith of adjacent pads 66 which were thus reoriented at the close of the leftward movement of the head 24. It is assumed too that upon closure of a main switch (not shown) and a start switch (line 39) a motor M2 (FIG. 9) driving the conveyor 20, and the motor M1 driving the conveyor 22 are running, contacts R8 having closed upon energization of the relay R8 (line 39), and that the next work piece, for instance a towel P, to be positioned is approaching the photocell 38 on the conveyor 20. If the head 24 were not thus initially located, a jogging switch 109 (line 17 or 45) for effecting such positioning is provided as hereinafter explained. Now a relay R1 (line 3) is energized and hence contacts R1 (line 6) are closed and R1 contacts in line 22 are open.

With closure of the main switch, a relay R3 (line 5) is energized. Therefore, unlike the conditions shown in FIGS. 8 and 9, contacts R3 (lines 6 and 32) are now open, the latter releasing a brake coil 114 on the motor M2 and simultaneously engaging its clutch coil 116 by closing contacts R3 (line 30) to operate the conveyor 20. Similarly at this time, relay R7 (line 19) being energized since contacts R5 (line 19) are closed, relay contacts R7 (line 37) are open to release the brake coil 118 of motor M1 and contacts R7 (line 35) close to clutch and drive the conveyor 22.

On approaching the pick-up position the piece P interrupts a light beam to the photocell 38. This deenergizes a relay R3 (line 6) to close contacts R3 (line 6), and hence energizes a relay R4 (line 6) which remains energized through its holding circuit (line 7). The energization of the relay R4 also energizes the motor 54 preparatory to moving the head 24 to the right, i.e. M3F of line 43 (FIG. 9) is energized. Now too, the solenoid valve S1 (line 13) becomes energized through contacts R4 to admit air under pressure into the cylinder 50 thereby lowering the pads 66 into work-engaging and pick-up position. By means of the clamping nut 74 the arms 62, 64 will have been adjusted angularly so that the pads 66 respectively contact the corner portions of the particular work piece P.

The closure of the contact R4 in line 8 energizes timer relays T1 and T2. When timer T1 completes its time cycle the contact T1 (line 11) closes to energize mechanical type latched relay LR1. Accordingly the solenoid valve S2a (line 18) is energized through the contact LR1 and fluid pressure admitted to the cylinders 80 to cause their pads 66 to project radially from the cylinder 50 thereby seizing and tensioning lightly the outspread engaged work piece. The timer T2 is set to provide time for the head lowering and the work seizing whereupon the T2 contact (line 13) opens to deenergize the solenoid S1 and allow spring retraction upwardly of the head 24 with the outspread work piece. The timer contact T2 (line 15) closes to complete the circuit through the LR1 contact energizing the relay R6. Now the contact R6 (line 25) is closed to set a clutch coil 110 (line 25) of the energized motor 54 and release its brake 112 so that the raised head 24 with a horizontally tensioned work piece will be moved to the right in FIGS. 1 and 2 and over the conveyor 22.

The motor 54 continues to advance the head 24 until both paddle limit switches 2A and 2B (FIGS. 2 and 8) are tripped by virtue of engagement therewith of the leading edge of the piece P, the head 24 when askew pivoting about the axis of the piston rod 58 if need be to position the work piece as a whole. As a consequence the energized relay R2 (line 4) opens the contact R2 (line 7) to energize the relay R4 and thereby resets the timers T1 and T2. Now the latched relay LR1 (line 11) deenergizes the relay R6 (line 15) to unclutch the motor 54 by opening its closed contact R6 and reclosing its brake contact R6 to stop the head 24. A relay R5 (line 21) now becomes energized through contacts R2 and R4 (line 21) and, through now closed contact R5 (line 42), energizes the motor 54 (i.e. M3R of line 44) preparatory to moving the head 24 reversely, for returning the empty head toward its pick-up position. The energizing of the relay R5 also restarts the timing cycle of T1 and T2 relays when the relay R4 is deenergized.

With the head 24 now holding the properly oriented, outstretched piece P, the solenoid valve S1 (line 13) is energized through contacts T2 and R5 (line 14) to lower the head toward deposit position for cooperation with the stationary belts 42. The T1 timer contacts (line 11) close to complete the circuit through R5 (line 12) to energize the unlatch coil ULR-1 of the latched relay LR1. The solenoid valve S2a (line 18) accordingly now releases the pistons 82 thereby radially retracting the four pads 66 from their extended positions and leaving the piece P extended and secured upon the belts 42. In order to insure proper release and transfer of the fabric, a solenoid valve S2b (line 10) is momentarily energized through T3 contacts (line 10) to effect momentary retraction of the pistons 82 beyond their neutral positions, respectively.

T2 timer contacts (line 13) open after the timing period to deenergize the valve S1 and permit the upward raising of the now empty head 24. The timer T2 contacts (line 15) close to energize the relay R6 and hence the clutch coil 110 whereby the motor 54 can now return the head 24 to its starting position over the conveyor 20. Then the paddle limit switches 1a and 1b reclose to energize the relay R (line 3). This deenergizes the relay R5 (line 21) to deenergize the motor 54 and the electrical cycle is completed. The stopped conveyor 22 having received the oriented piece P will restart when contact T2 (line 20) closes during the upward stroke of the piston 56 of the unloaded head 24. Accordingly the piece P will be moved into correct position in the next station for imprinting or other processing.

While the invention has been described as applied to positioning fabric pieces as received from the indexed conveyor 20, it will be clear that it may equally well be used to position on the conveyor 22 pieces P which were stacked in a stationary pile at the pick-up position. It will also be apparent that, whether the pick-up position be on the indexing conveyor 20 or on a stack, the head 24 may be operative to accurately stack successive work pieces at the delivery position instead of at successive positions on the conveyor 22.

FIGS. 10 and 11 indicate an alternate form of the invention explained with reference to FIGS. 1 through 9 and useful where greater accuracy of positioning is needed. A pair of sensors 120, 120 (FIG. 11) is mounted in lieu of the switches 2a and 2b. A servo stepping motor 122 (FIG. 10) of a transfer head 124 is arranged to rotate the rod 58 about its axis and hence rotatably adjusts the pads 66 together with a seized work piece according to signal received from one or the other of the sensors 120 in response to its being approached and/or contacted by the leading edge of the work. Upon a balanced signal being received from the two sensors 120, no torque is exerted and the correctly oriented piece may be deposited as previously described.

FIGS. 12 and 13 show a further modification of the invention usually found preferable to that shown in FIGS. 10 and 11 since it is simpler, entirely reliable, and has work aligning accuracy found to be sufficiently high for most practical purposes. The rotary transfer head 24 and the conveyor 22 are of the same construction and have operation essentially similar to that disclosed with reference to FIGS. 1–9. A straight line determinative of the desired orientation of a piece P to be deposited is adjustably established by a pair of work sensors such as photocells 130, 130 adjustably mounted on a crossbar 132 of the conveyor 22. The arrangement is such that when the leading edge of a work piece P carried by the head 24 arrives to intercept the light to either cell 130, a solenoid valve 133 (FIG. 12) controlling the admission of air under pressure to an adjacent one of a pair of cylinders 134, 134 secured on the crossbar 132 is consequently actuated. A piston rod 136 of that cylinder is thus caused to shift its integral pusher plate 138, against resistance of a return spring (not shown), to the left against the adjacent pad 66 whereby the carrier head 24 is correctively rotated until the cell 130 first intercepted is again uncovered by the leading work edge and the other cell 130 is intercepted by the work to effect corresponding but opposite corrective torque by its adjacent cylinder 134. The motor 54, as previously, tries to advance the carrier head 24 to the right in FIGS. 12, 13 until both cells 130 are intercepted by the leading work edge whereupon it is aligned as desired and the head 24 immediately ceases all advance and rotation, and deposit of the aligned work piece on the belts 42 is then effected. It will be understood that the fluid pressure system employed for positioning the head 24 may be pneumatic or hydraulic. As the pads 66 descend, the plates 138 are allowed to rotate about the axes of the rods 136, respectively, if so urged by the contacts with the pads.

Having thus described my invention, what I claim as new and desire to secure by Letters Patent of the United States is:

1. Apparatus for predeterminedly positioning successive work pieces on a conveyor comprising a rotatable transfer head movable in translation between a pick-up position and a deposit over the conveyor, means for controlling heightwise positioning of the head into and out of work seizing relation at said positions, respectively, and a pair of adjustably spaced abutments having engagement faces located in the same vertical plane and mounted on the conveyor in the vicinity of said deposit position for cooperative engagement with one of the transfer head and the leading edge of each piece, at spaced localities, in order to rotate the head and predeterminedly orient the piece for deposit on the conveyor according to selected positioning of said abutments.

2. Apparatus as set forth in claim 1 and further characterized in that reversible power means is provided for moving the head in translation, and control means responsive to work piece engagement with both of said abutments is operative automatically to cause the head heightwise positioning means to lower a work piece onto the conveyor.

3. Fabric positioning mechanism comprising a head mounted for movement in translation along a path, the head including a member movable toward and from work-engaging relation on an axis normal to said path and rotatable about said axis, a plurality of radially extendable arms carried by the member, means for securing the arms in selected angular relation with respect to one another about said axis, fabric engaging and seizing means respectively secured to outer portions of the arms, means disposed along said path and cooperative with a fabric work piece held tensioned by said seizing means for determining its orientation, and automatic means operable in response to operation of the last-mentioned means for releasing the work piece as thus oriented.

4. Mechanism as set forth in claim 3 wherein said work piece orientation determining means includes a pair of light responsive cells adjustably mounted, and a fluid pressure operated actuator responsive to each of said cells for urging said arms to rotate the work about said axis and into alignment with the light beams controlling said cells.

5. Mechanism as set forth in claim 3 wherein the fabric engaging and seizing means are respectively comprised of card cloth.

6. The combination with mechanism as set forth in claim 3, and a fabric receiving means including adjustably spaced card cloth arranged marginally to engage the work piece on a side thereof opposite to that engaged by said fabric engaging and seizing means of said head, said receiving means being adapted to maintain the fabric outspread and under tension.

7. The combination with mechanism as set forth in claim 5 of a fabric carrying conveyor cooperative with said head for receiving oriented work pieces therefrom, said conveyor including spaced endless work-carrying belts at least a portion of which is comprised of card cloth.

8. The combination as set forth in claim 3, further characterized by the provision of automatic means for simultaneously extending said arms to tension the fabric in its own plane when engaged by said seizing means.

9. Fabric positioning means as set forth in claim 7 further characterized by the provision of means for simultaneously projecting the plurality of card cloths to tension the work piece seized thereby and maintain it under tension during translatory movement of said head, and guide means for maintaining said work-carrying belts in parallel relation to maintain tension in each oriented work piece transferred thereto.

10. In fabric positioning mechanism, a rotary transfer head comprising a plurality of radially extensible arms respectively supporting a fabric seizing pad in a common plane, mechanism for adjustably securing the arms in selected angular relation to one another, mechanism for simultaneously moving the pads radially to seize or release a fabric piece, and power means for moving the head to shift the piece in its own plane and heightwise thereof to a predetermined position.

11. For use in transferring fabric work pieces successively between a pick-up position and a delivery position, a transfer head, reversibly operable conveyor means for moving the transfer head into and out of juxtaposition with a work piece in said positions, said head including a cylinder, a rotatable piston rod reciprocable in the cylinder, a plurality of fabric seizing and tensioning means carried by said rod for rotation therewith in unison, fluid pressure means for causing the rod to move the fabric seizing means into work-engaging relation at the pick-up position and into and out of work releasing relation at said delivery position, other fluid pressure means for controlling operation of the respective fabric seizing and tensioning means radially of the rod, and a pair of work sensing devices adjacent to said delivery position and responsive to a leading edge of each work piece being transferred by the head to determine uniform orientation of the piece prior to release therefrom.

12. Apparatus for uniformly feeding and positioning successive pieces of fabric to an operating station comprising a first conveyor, means responsive to successive work pieces thereon for stopping the first conveyor with a work piece in a pick-up position wherein a work piece edge is disposed in approximately predetermined relation on the first conveyor, a second conveyor operable independently of the first and having a feeding path extending therefrom to said operating station, a transfer head cyclically movable in translation between a position in juxtaposition with the work pick-up position on said first conveyor and a delivery position on the second conveyor, said head being pivotal about an axis normal to said feeding path and adapted to carry each piece outspread in a plane generally parallel to said path, control means associated with the second conveyor in the vicinity of said delivery position and responsive to the arrival thereat of successive work pieces carried by said head predeterminedly to orient the pieces by effecting pivotal movement of the head about said axis, means responsive to operation of said control means for temporarily stopping operation of the second conveyor and causing said head to deposit the work piece as oriented onto said second conveyor, and other means responsive to release of the oriented work piece from the head to return the head to its juxtaposed position with respect to said pick-up position.

References Cited
UNITED STATES PATENTS

| | | | |
|---|---|---|---|
| 2,769,529 | 11/1956 | Soriano et al. | 108—179 |
| 3,092,270 | 6/1963 | Slamar et al. | 214—89 |
| 3,097,733 | 7/1963 | Frydryk | 198—33.2 |

HUGO O. SCHULZ, *Primary Examiner.*

R. J. HICKEY, *Assistant Examiner.*

UNITED STATES PATENT OFFICE
CERTIFICATE OF CORRECTION

Patent No. 3,356,237                               December 5, 1967

Richard R. Walton

It is certified that error appears in the above identified patent and that said Letters Patent are hereby corrected as shown below:

Column 7, line 9, after "deposit" insert -- position --.

Signed and sealed this 16th day of December 1969.

(SEAL)
Attest:

Edward M. Fletcher, Jr.                      WILLIAM E. SCHUYLER, JR.
Attesting Officer                                Commissioner of Patents